United States Patent
Craft et al.

(10) Patent No.: US 7,882,183 B2
(45) Date of Patent: Feb. 1, 2011

(54) MANAGING A RESPONSE TO AN EMAIL BY A HIDDEN EMAIL RECIPIENT

(75) Inventors: David J. Craft, Austin, TX (US); Vinit Jain, Austin, TX (US); Rajeev Mishra, Austin, TX (US); Lance W. Russell, Rosanky, TX (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 11/427,837

(22) Filed: Jun. 30, 2006

(65) Prior Publication Data

US 2008/0005355 A1    Jan. 3, 2008

(51) Int. Cl.
G06F 15/16 (2006.01)
G06F 17/27 (2006.01)

(52) U.S. Cl. ............... 709/206; 709/204; 709/205; 709/245; 709/246

(58) Field of Classification Search ......... 709/206, 709/245, 246, 204, 205
See application file for complete search history.

(56) References Cited

U.S. PATENT DOCUMENTS

2003/0200263 A1* 10/2003 Goldberg ............... 709/206
2005/0160292 A1* 7/2005 Batthish et al. ........... 713/201
2006/0212523 A1* 9/2006 Daniels et al. ........... 709/206
2007/0073871 A1* 3/2007 Adams et al. ........... 709/224
2007/0203988 A1* 8/2007 Lee et al. ............... 709/206

OTHER PUBLICATIONS

"Selective Hidden Note area(s), for any blind carbon copy (bcc:) recipients and nested blind carbon copy", Research Disclosure, International Business Machines Corporation, Dec. 2001, disclosure 452161, p. 2144, 1 page.

"Sending Email Secret Messages to the Blind Copy Recipient", Research Disclosure, International Business Machines Corporation, Mar. 2000, disclosure 431120, p. 539, 1 page.

* cited by examiner

Primary Examiner—John Follansbee
Assistant Examiner—Nghi V Tran
(74) Attorney, Agent, or Firm—Matthew W. Baca; Amy J. Pattillo (57) ABSTRACT

A method, system, and program are provided for managing a response to an email by a hidden email recipient. A hidden recipient manager detects a request to respond to an electronic communication by a hidden recipient of that electronic communication from among a plurality of recipients of the electronic communication. The hidden recipient detects whether the request to respond is addressed to at least one recipient other than a sender of the electronic communication. If the request to respond is addressed to at least one recipient other than a sender of the electronic communication, then the hidden recipient manager warns the hidden recipient that the request to respond is addressed to at least one recipient who is unaware of the recipient of the electronic communication by the hidden recipient.

11 Claims, 3 Drawing Sheets

MANAGING A RESPONSE TO AN EMAIL BY A HIDDEN EMAIL RECIPIENT

BACKGROUND OF THE INVENTION

1. Technical Field

The present invention relates generally to managing electronic mail (email). Further, the present invention relates to managing a response to an email by a hidden email recipient, wherein the receipt of the email by the hidden email recipient is blocked from at least one other recipient of the email.

2. Description of the Related Art

To send an electronic communication, such as electronic mail (email), a sender typically composes the email message and addresses that message to one or more recipients. In addressing an email message, an email composition application may provide a sender with an option to select to send the email to some recipients as direct recipients, some recipients as a carbon copy (CC), and to other recipients as a blind carbon copy (BCC). In handling distribution of an email, an email service sends a copy of the email to all the addressees, but does not disclose the BCC recipient's address in the copy of the email received by any other recipients of the same email. In another example, an email composition application or email service may not offer a BCC option, but may provide other options for a sender to request to "hide" one or more recipients of the email by blocking other recipients from seeing that the email was sent to the hidden recipients. For example, a sender may place those addresses that are to be hidden within a set of parenthesis.

There are many reasons that a sender may wish to use an option to hide one or more recipients of the email from the other recipients of the same email when addressing an email message. For example, as a courtesy to recipients, a sender may use an option for hiding recipients to an email to protect the security of the email address of each recipient. In another example, a sender may use an option for hiding email recipient addressing so that hidden recipients may anonymously monitor the email. For example, a sender may want to add a boss or an administrator as an addressee of an email communication, to allow monitoring of the email communication, without disclosing that the email is being monitored.

A limitation of email services that provide an option to hide one or more recipients of an email is that the copy of the email received by the hidden recipient does not alert the recipient to this hidden status. In addition, another limitation of email services that provide an option to hide one or more recipients of an email is that when the hidden recipient selects to respond to that email to anyone other than the sender, such as selecting to reply all, the hidden recipient is not alerted that the hidden recipient has selected a response that will reveal the identity of the hidden recipient to recipients who previously did not know that the hidden recipient received the email.

Therefore, in view of the foregoing, it is apparent that there is a need for a method, system, and program for managing a response to an email by a hidden recipient, by alerting the hidden recipient when the recipient has requested a response that will disclose the hidden recipient and/or blocking the hidden recipient from selecting particular response options that would disclose hidden recipient.

SUMMARY OF THE INVENTION

Therefore, the present invention provides a method, system, and program for managing a response to an email by a hidden email recipient.

In one embodiment, a hidden recipient manager detects a request to respond to an electronic communication by a hidden recipient of that electronic communication from among a plurality of recipients of the electronic communication. The hidden recipient detects whether the request to respond is addressed to at least one recipient other than a sender of the electronic communication. If the request to respond is addressed to at least one recipient other than a sender of the electronic communication, then the hidden recipient manager warns the hidden recipient that the request to respond is addressed to at least one recipient who is unaware of the recipient of the electronic communication by the hidden recipient.

The hidden recipient manager may detect the request to respond from a selection by the hidden recipient of a selectable option to reply to all of the previous recipients of the electronic communication and the sender. In another example, the hidden recipient manager may detect the request to respond from a selection by the hidden recipient of a selectable option to forward the electronic communication to at least one additional recipient other than the sender. Further, the hidden recipient manager may detect the request to respond from a selection by the hidden recipient to copy at least a portion of the content of the electronic communication.

In addition, the hidden recipient manager may block the hidden recipient from access to one or more response options ordinarily available from responding to electronic communication, when the hidden recipient is viewing the electronic communication. For example, the hidden recipient manager may block a hidden recipient of the electronic communication from access to a reply all or forward function.

In warning the hidden recipient, the hidden recipient manager may control output of a separate window requiring the hidden recipient to select to continue with the response request or cancel the response request. In addition, in warning the hidden recipient, the hidden recipient manager may control output of an audible indicator that the request to respond is addressed to at least one recipient unaware of recipient of the electronic communication by the hidden recipient.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
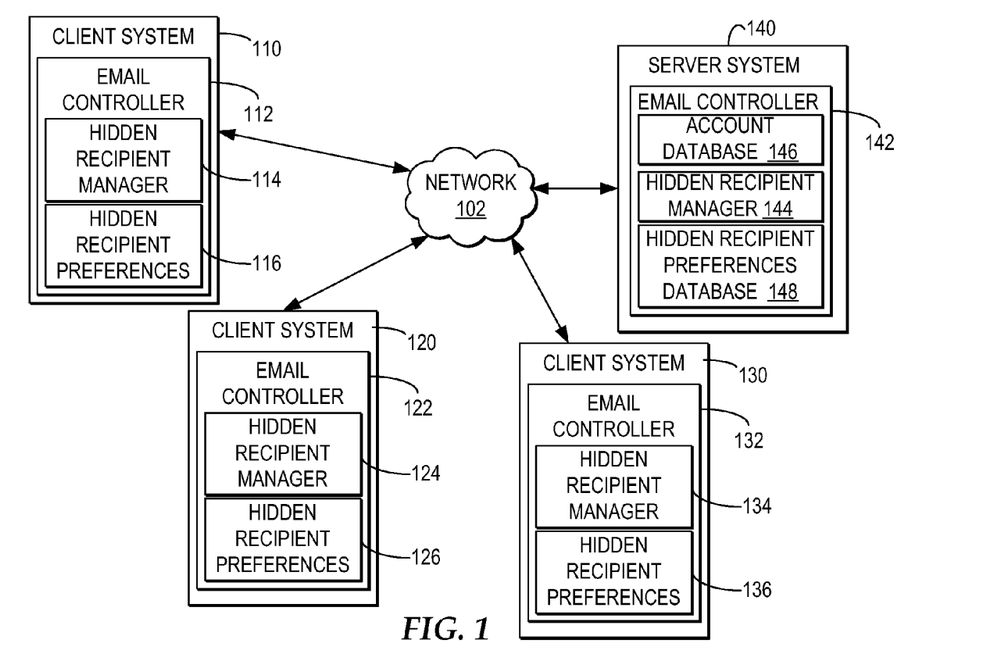
FIG. 1 is a block diagram depicting one example of an electronic communication environment for supporting electronic communications to hidden recipients and managing responses to electronic communications by hidden recipients.

With reference now to FIG. 1, a block diagram depicts one example of an electronic communication environment for supporting electronic communications to hidden recipients and managing responses to electronic communications by hidden recipients. It will be understood that multiple types of network environments may implement multiple types of electronic communications where one recipient of a communication is hidden from another recipient of the communication. Thus, while the embodiment is described with reference to network environment for supporting email communications, with at least one recipient of the email hidden from the other recipients of the email, the invention may apply to other types of networks supporting other types of electronic communications including, but not limited to, instant messaging communications, telephony based communications, and other communications between multiple parties via a network.

As illustrated, a network 102 facilitates communication between multiple systems communicatively connected via network 102. Network 102 may include, but is not limited to, packet-switching networks, such as the Internet or an intranet, and telephony networks. In addition, network 102 may include switches, gateways, server systems, and other computing systems with hardware and software that enables communication channels between multiple systems using one or more types and levels of network protocols. Further, network 102 may provide service to multiple systems through multiple service providers, where each service provider enables a communicative connection for a system to network 102.

In the example, network 102 facilitates communication between client systems 110, 120, and 130 and a server system 140, where server system 140 manages distribution of electronic communications between users logged in at client systems 110, 120 and 130. In addition, in the example, network 102 may facilitate communication between client systems 110, 120, and 130, where client systems 110, 120, and 130 communicate in a peer-to-peer network configuration.

Each of client systems 110, 120, and 130 include or access an email controller 112, 122, and 132, respectively. The client-side email controllers enable a user to receive and send email communications. In one example, the client-side email controller enables a user to log into an email communication service that facilitates distribution of emails composed by the user and receipt of emails sent by others to the user. A client-side email controller may be implemented through stand-alone applications and web browsers. In addition, a client-side email controller may facilitate user access to and participation in other types of electronic communications, such as instant messaging.

In addition, server system 140 includes an email controller 142. Email controller 142 receives emails from client systems and delivers those emails to recipients at other client systems. In the example, email controller 142 accesses an account database 146 which includes the identification, addressing, and storage boxes for each registered user. In addition, although not depicted, email controller 142 may forward a copy of an email to another email controller, and the other email controller then delivers the email to the addressed recipient.

In addressing an email to recipients, the client-side email controller or server-side email controller may enable a user to address an email to multiple recipients, where a user may designate one or more general recipients, one or more carbon copy recipients, and one or more hidden recipients. In one example, a user may specify a hidden recipient by addressing the recipient to receive a blind carbon copy (BCC) of the email. It will be understood that additional or other types of recipients may be designated and that additional or alternate methods may be provided for a sender to specify a recipient as a hidden recipient.

When an email includes hidden recipients, the copy of the email sent to the general or carbon copy recipients does not include the address of the hidden recipients, but the copy of the email sent to the hidden recipients includes all recipients other than any other hidden recipients. Either of the client-side email controller or server-side email controller may control this distribution of the email so that the address of any hidden recipient is not disclosed to any other recipient.

In addition, in an email in which a user is a hidden recipient, an indicator is included with the email communication send to the user or in a separate communication to the user, indicating that the user is a hidden recipient. In one example, a header field of the email communication may specify that the user receiving that copy of the email is a hidden recipient. In another example, email controller 142 may attach a hidden recipient code, digitally encrypt an email sent to a hidden recipient, or adjust the email communication in some other manner to indicate that the user receiving the copy of the email is a hidden recipient of the email. It will be understood that a hidden recipient manager may detect when the user is a hidden recipient from additional or alternate types of communications.

In addition, each of email controllers 112, 122, and 132 may include or access hidden recipient managers 114, 124, and 134, respectively, and email controller 142 may access a hidden recipient manager 144, for managing responses by a hidden recipient to an email. In one example, the hidden recipient manager blocks one or more selectable response options normally available for response to an email, but blocked for those emails to which the user is a hidden recipient. In another example, the hidden recipient manager alerts the user or blocks the user when the user selects to respond to an email to which the user is a hidden recipient. It will be understood that a hidden recipient manager may perform additional or alternate types of management of responses to an email by a hidden recipient.

In particular, the hidden recipient manager may specify the management of responses to emails by a user who is a hidden recipient in the emails by applying one or more hidden recipient preferences, such as hidden recipient preferences 116, 126, and 136, at a client system, or the hidden recipient preferences for a particular user accessed from hidden recipient preferences database 148. Hidden recipient preferences, as will be further described with reference to FIG. 5, may include preferences for conditions that trigger the hidden recipient manager to manage responses by the user to an email to which the user is a hidden recipient and preferences for the type of management to apply, including, but not limited to, blocking response options and providing warnings.

It is important to note that while hidden recipient preferences 116, 126, and 136 are described with reference to a single user's preferences, the preferences may apply to one or more users. In addition, it is important to note that hidden recipient preferences database 148 may include hidden recipient preferences according to user identifier, group association, or other criteria and hidden recipient manager 144 may apply sets of preferences to one or more users registered in account database 146. For example, one set of hidden recipient preferences may be specified in hidden recipient preferences database 148 for all users with registered accounts in account database 146 that allow for manager level security clearance.

It will be understood that while email controllers 112, 122, 132, and 142, hidden recipient managers 114, 124, 134, and 144, and hidden recipient preferences 116, 126, 136 and hidden recipient preferences database 148 are each illustrated within a particular system, each of client systems 110, 120, and 130 and server system 140 may represent one or more systems and each of the controls, managers and preferences may be accessible within a single system, accessible from another system, or distributed across multiple systems and from data storage systems. In addition, it will be understood that while a single network 102 is illustrated, multiple separate network environments may be implemented in supporting electronic communications between multiple users.

Figure 2:
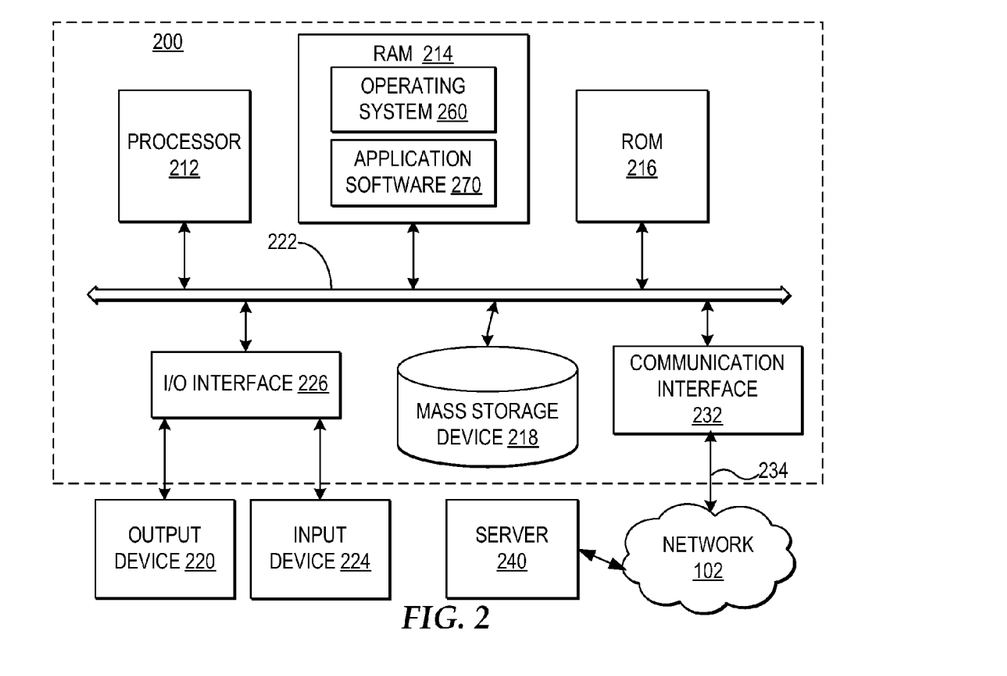
FIG. 2 is a block diagram illustrating one embodiment of a computing system in which the present invention may be implemented.

Referring now to FIG. 2, a block diagram depicts one embodiment of a computing system in which the present invention may be implemented. The present invention may be executed in a variety of systems, including a variety of computing systems, such as computing system 200, communicatively connected to a network, such as network 102. For example, client system 110, client system 120, client system 130, and server system 140 may be implemented using a computing system or grouping of computing systems, such as computing system 200.

Computer system 200 includes a bus 222 or other communication device for communicating information within computer system 200, and at least one processing device such as processor 212, coupled to bus 222 for processing information. Bus 222 preferably includes low-latency and higher latency paths that are connected by bridges and adapters and controlled within computer system 200 by multiple bus controllers. When implemented as a server, computer system 200 may include multiple processors designed to improve network servicing power. Where multiple processors share bus 222, additional controllers (not depicted) for managing bus access and locks may be implemented.

Processor 212 may be a general-purpose processor such as IBM's PowerPC (PowerPC is a registered trademark of International Business Machines Corporation) processor that, during normal operation, processes data under the control of an operating system 260, application software 270, middleware (not depicted), and other code accessible from a dynamic storage device such as random access memory (RAM) 214, a static storage device such as Read Only Memory (ROM) 216, a data storage device, such as mass storage device 218, or other data storage medium. In one embodiment, the operations performed by processor 212 may control management hidden recipient responses to an email as depicted in the operations of flowchart of FIGS. 6 and 7 and other operations described herein. Operations performed by processor 212 may be requested by operating system 260, application software 270, middleware or other code or the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 200 to perform a process according to the present invention. The term "machine-readable medium" as used herein includes any medium that participates in providing instructions to processor 212 or other components of computer system 200 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 200 can read and which is suitable for storing instructions. In the present embodiment, an example of a non-volatile medium is mass storage device 218 which as depicted is an internal component of computer system 200, but will be understood to also be provided by an external device. Volatile media include dynamic memory such as RAM 214. Transmission media include coaxial cables, copper wire or fiber optics, including the wires that comprise bus 222. Transmission media can also take the form of acoustic or light waves, such as those generated during radio frequency or infrared data communications.

Moreover, the present invention may be downloaded or distributed as a computer program product, wherein the program instructions may be transferred from a remote computer such as a server 240 to requesting computer system 200 by way of data signals embodied in a carrier wave or other propagation medium via network 102 to a network link 234 (e.g. a modem or network connection) to a communications interface 232 coupled to bus 222. Communications interface 232 provides a two-way data communications coupling to network link 234 that may be connected, for example, to a local area network (LAN), wide area network (WAN), or directly to an Internet Service Provider (ISP). In particular, network link 234 may provide wired and/or wireless network communications to one or more networks, such as network 102. Further, although not depicted, communication interface 232 may include software, such as device drivers, hardware, such as adapters, and other controllers that enable communication. When implemented as a server, computer system 200 may include multiple communication interfaces accessible via multiple peripheral component interconnect (PCI) bus bridges connected to an input/output controller, for example. In this manner, computer system 200 allows connections to multiple clients via multiple separate ports and each port may also support multiple connections to multiple clients.

Network link 234 and network 202 both use electrical, electromagnetic, or optical signals that carry digital data streams. The signals through the various networks and the signals on network link 234 and through communication interface 232, which carry the digital data to and from computer system 200, may be forms of carrier waves transporting the information.

In addition, computer system 200 may include multiple peripheral components that facilitate input and output. These peripheral components are connected to multiple controllers, adapters, and expansion slots, such as input/output (I/O) interface 226, coupled to one of the multiple levels of bus 222. For example, input device 224 may include, for example, a microphone, a video capture device, a body scanning system, a keyboard, a mouse, or other input peripheral device, communicatively enabled on bus 222 via I/O interface 226 controlling inputs. In addition, for example, a display device 220 communicatively enabled on bus 222 via I/O interface 226 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 2 may vary. Furthermore, those of ordinary skill in the art will appreciate that the depicted example is not meant to imply architectural limitations with respect to the present invention.

Figure 3:
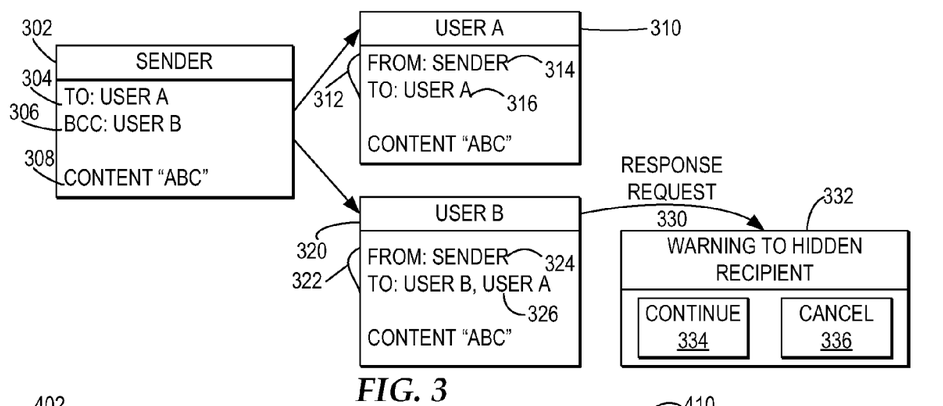
FIG. 3 is an illustrative diagram depicting one example of managing a response to an electronic communication by a hidden recipient of that communication.

Referring now to FIG. 3, an illustrative diagram depicts one example of managing a response to an electronic communication by a hidden recipient of that communication. In the example, a sender composes an electronic communication 302 addressed to "user A", as illustrated at reference numeral 304, and blind carbon copied (BCC) to "user B", as illustrated at reference numeral 306. A user addressed under "BCC" is designated as a hidden recipient. Electronic communication 302 includes content "ABC", as illustrated at reference numeral 308, which may include text, audio, graphics, video, and other types of media transmittable in electronic communication 302.

As illustrated at reference numeral 310, the copy of electronic communication 302 received by "user A" includes a header 312. Header 312 indicates that the electronic communication is from "sender", as illustrated at reference numeral 314 and to "user A", as illustrated at reference numeral 316, with the same content "ABC" as electronic communication 302. Header 312 does not include an indicator that "user B" is an addressee of electronic communication 302 because "user B" is a hidden recipient of electronic communication 302.

As illustrated at reference numeral 320, the copy of electronic communication 302 received by "user B" includes a header 322. Header 322 indicates that the electronic communication is from "sender", as illustrated at reference numeral 324 and addressed to both "user B" and "user A", as indicated at reference numeral 326. In addition, the electronic communication provided to "user B" includes the same content "ABC" as the original electronic communication 302.

In the example, responsive to any selection by "user B" to respond to the electronic communication, as illustrated at reference numeral 330, the hidden recipient manager will determine whether the response request triggers a warning condition. A response request by the user may include, but is not limited to, a request to reply to the email, a request to reply to all recipients of the email, a request to forward the email, and a request to copy and paste a portion of the content of the email.

In the example, the response request triggers the warning condition and the hidden recipient manager warns the user of the condition through a pop-up window 332. In one example, in pop-up window 332, the warning may indicate that the request to respond to the electronic mail includes an addressee that is not the sender of electronic communication 302. Within pop-up window 332, "user B" is given a selectable option 334 to continue with the response or a selectable option 336 to cancel the request. Upon selection of selectable option 334, the hidden recipient manager releases the email controller to continue processing the user request to respond to electronic communication 302. Otherwise, upon selection of selectable option 334, the hidden recipient manager directs the email controller to cancel the response request.

It is important to note that in the example, "user B" is not notified in header 322 that "user B" is a hidden recipient. For email controllers that do not notify recipients of a hidden recipient status, it is advantageous to provide a warning to that recipient, such as "user B", to indicate that "user B" is requesting to respond to an electronic communication in a way that will reveal that "user B" also received the communication to recipients who previously were unaware that "user B" received the communication. However, even if header 332 or another graphical or other output indicator informed "user B" of the hidden recipient status, because the sender chose to hide "user B" as an addressee of electronic communication 302, it is still advantageous to monitor how "user B" responds to electronic communication 302 and other electronic communications where "user B" is a hidden recipient and to provide additional warnings to "user B" as triggered by requests to respond to emails where "user B" is a hidden recipient.

In addition, it is important to note that while in the example depicted, each of the addressed recipients received the same content "ABC", in other examples, the "sender" may specify some portions of content only appear to the bcc addressee or some portions of content only appear to non-bcc addressees. For example, the "sender" may specify that portion "A" of the content transmit and appear to all addressees, portion "B" of the content only transmit and appear to BCC addressees, and portion "C" of the content only transmit and appear to the general addressees.

It will be understood that while in the example, a pop-up window with selectable options is used to warn the hidden recipient, in other embodiments, the hidden recipient manager may implement other types of outputs available for a particular output interface. For example, the hidden recipient manager may control output of an audible warning message. In another example, the hidden recipient manager may block the requested response request and provide a message indicating that the request was blocked because the user is a hidden recipient.

Figure 4:
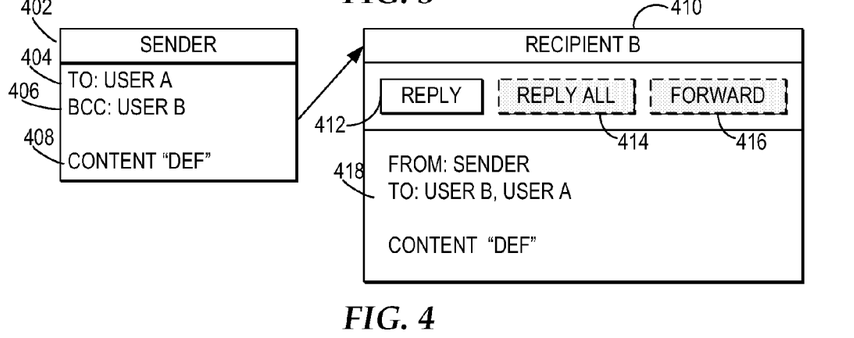
FIG. 4 is an illustrative diagram illustrating one example of monitoring and managing user responses to electronic communications by disabling particular functions of electronic communications for which the user is a hidden recipient.

With reference now to FIG. 4, an illustrative diagram depicts one example of monitoring and managing user responses to electronic communications by disabling particular functions of electronic communications for which the user is a hidden recipient. In the example, a sender composes an electronic communication 402 addressed to "user A", as illustrated at reference numeral 404, and blind carbon copied (BCC) to "user B", as illustrated at reference numeral 406. Electronic communication 402 includes content "DEF", as illustrated at reference numeral 408, which may include text, audio, graphics, video, and other types of media transmittable in electronic communication 402.

In the example, as "user B" receives electronic communication 402, the hidden recipient manager detects that "user B" is a hidden recipient and automatically selects to disable any functions that enable "user B" to respond to electronic communication 402, other than responding to the "sender". In the example, normally, the email controller provides a user with the option to respond to an electronic communication by selecting from buttons to reply to the sender, as illustrated at reference numeral 412, to reply to all other recipients and the sender, as illustrated at reference numeral 414, and to forward the electronic communication to addressees to be determined by "user B", as illustrated at reference numeral 416.

In the example, however, for electronic communication 402, because "user B" is a hidden recipient, the hidden recipient manager blocks the options to "reply all" and to "forward", as indicated by the shading of the selectable buttons illustrated at reference numeral 414 and 416. In another example, the hidden recipient manager may block the selectable options for "reply all" and "forward" in a menu or may block the function keys from calling each of these functions. Further, in another example, the hidden recipient manager may not actually block the functions, but may only graphically distinguish functions, such as "reply all" and "forward", to illustrate to the user that the user is a hidden recipient of the electronic communication. In addition, in another example, the hidden recipient manager may block the "reply all" and "forward" options, but provide a separate selectable option or command to reopen these options.

Figure 5:
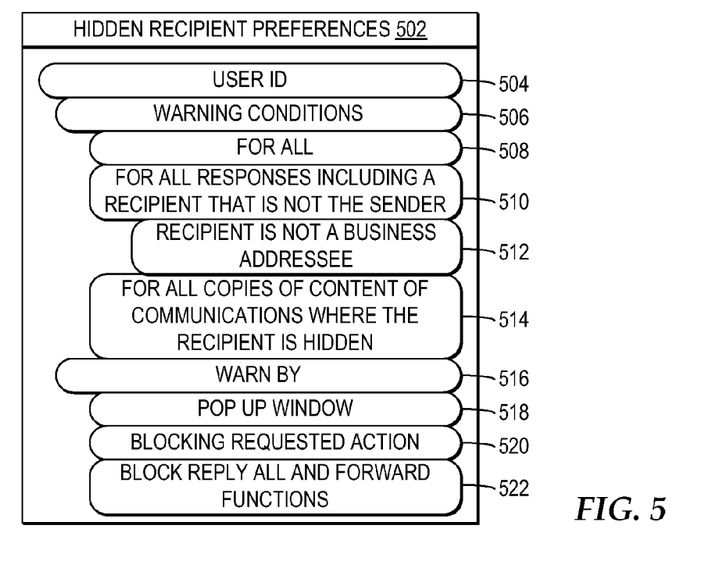
FIG. 5 is a block diagram depicting one example of hidden recipient preferences.

Referring now to FIG. 5, a block diagram depicts one example of hidden recipient preferences. In the example, hidden recipient preferences 502 includes preferences for a particular user, stored according to user identifier (ID), as illustrated at reference numeral 504. It will be understood that hidden recipient preferences 502 may be stored locally, at a client system, with a particular user's electronic communication preferences, or may be stored remotely, such as by an electronic communication service provider. In addition, it will be understood that a set of preferences may also be stored according to a group identifier, a security access level, or other criteria that specifies the applicability of the set of preferences.

In the example, a set of hidden recipient preferences may include warning conditions, as illustrated at reference numeral 506. Examples of warning conditions include, but are not limited to, warning for all replies by the user to a communication that the user is a hidden recipient of, as illustrated at reference numeral 508, warning for all replies by the user to a communication that the user is a hidden recipient of in which the reply includes an addressee that is not the sender being replied to, as illustrated at reference numeral 510, warning for all replies by the user to a communication that the user is a hidden recipient of in which the reply includes an addressee that is not the sender being replied to and the addressee is not another employee of the user's employer, as illustrated at reference numeral 512, and warning for all copies of the content of a communication where the user is a hidden recipient, as illustrated at reference numeral 514. It is important to note that a user may select one or more warning conditions. In addition, it is important to note that a user may further condition a warning based on the identity of the sender, the identity of the recipient, the content of the email communication, and other factors associated with a response to an electronic communication.

In addition, in the example, a user's hidden recipient preferences may include ways to warn, or "warn by" directions, as illustrated at reference numeral 516. Examples of "warn by" directions include, but are not limited to, warning by a pop up window, as illustrated at reference numeral 518, warning by blocking a requested action, as illustrated at reference numeral 520, and warning by blocking the "reply all" and "forward" functions, as illustrated at reference numeral 522. For example, a pop up window providing a warning may provide a message instructing the user that the user has requested to respond to a communication of which the user is a hidden recipient. In another example, blocking a requested action may include blocking a request to respond to a communication, by replying to all or forwarding the communication of which the user is a hidden recipient. In yet another example, blocking a "reply all" or "forward" function may include removing a button or menu option for the "reply all" or "forward" function or adjusting the graphical indication of the options when the user views a communication of which the user is a hidden recipient. It is important to note that additional or alternate directions may be selected for a user's hidden recipient preferences and that particular directions may be associated with one or more warning conditions.

Figure 6:
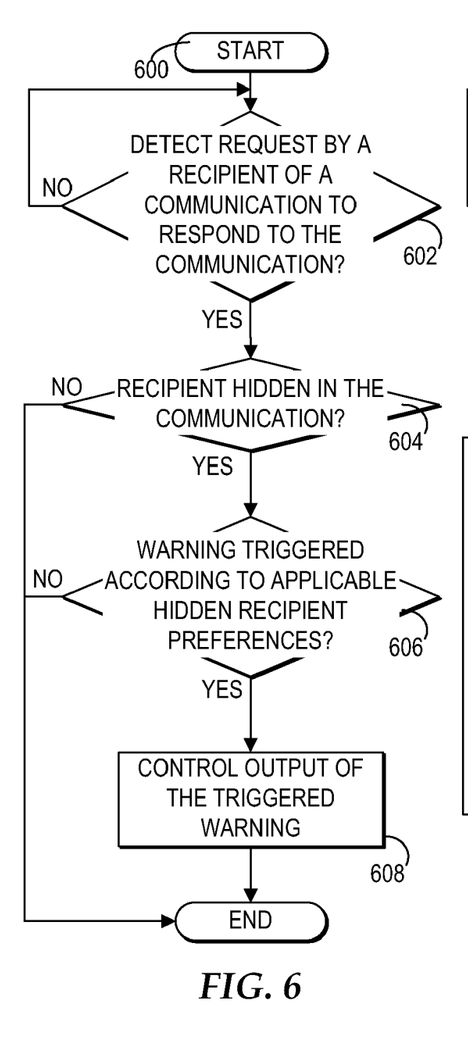
FIG. 6 is a high level logic flowchart illustrating a process and program for managing responses to an electronic communication by a hidden recipient of the communication.

With reference now to FIG. 6, a high level logic flowchart depicts a process and program for managing responses to an electronic communication by a hidden recipient of the communication. In the example, the process starts at block 600 and thereafter passes to block 602. Block 602 depicts a determination whether the hidden recipient manager detects a recipient of an email communication requesting to respond to the communication. If the hidden recipient manager detects requested response to the email communication, then the process passes to block 604. Block 604 illustrates a determination whether the recipient requesting the response is a hidden recipient of the email communication. If the recipient requesting the response is not a hidden recipient of the email communication, then the process ends. Otherwise, at block 604, if the recipient requesting the response is a hidden recipient of the email communication, then the process passes to block 606.

Block 606 depicts a determination whether a warning is triggered by the requested response according to an applicable selection of hidden recipient preferences. If a warning is not triggered, then the process ends. If a warning is triggered, then the process passes to block 608. Block 608 depicts controlling output of the triggered warning, and the process ends. In one example, a warning may be triggered by a hidden recipient's warning preferences if the hidden recipient requests a response that includes at least one recipient other than the sender of the email communication.

Figure 7:
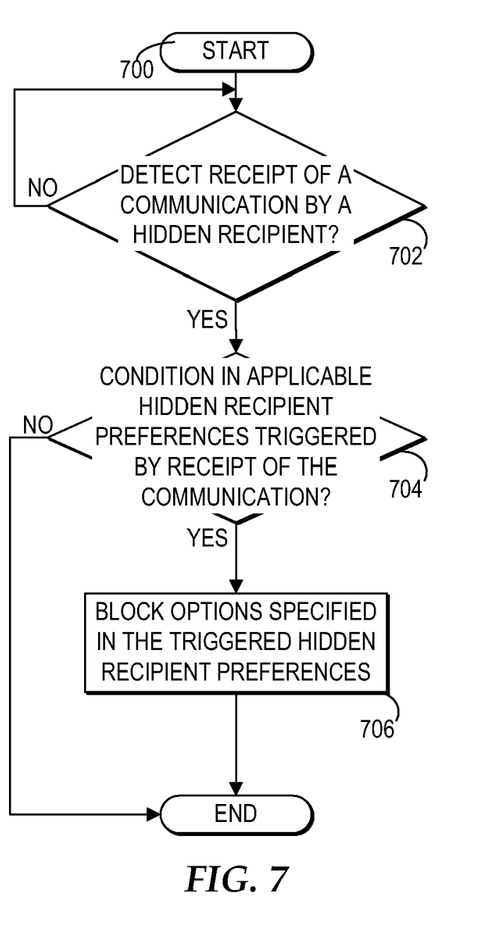
FIG. 7 is a high level logic flowchart depicting a process and program for managing options for responding to an electronic communication by a hidden recipient of the communication.

Referring now to FIG. 7, a high level logic flowchart illustrates a process and program for managing options for responding to an electronic communication by a hidden recipient of the communication. In the example, the process starts at block 700 and thereafter proceeds to block 702. Block 702 depicts a determination whether the hidden recipient manager detects receipt of an email communication by a hidden recipient. If the hidden recipient manager detects receipt of an email communication by a hidden recipient, then the process passes to block 704. Block 704 depicts a determination whether any conditions within the applicable hidden recipient preferences are triggered by receipt of the communication. For example, if a hidden recipient preference specifies that the reply all option should be blocked when the recipient views an email communication in which the recipient is a hidden recipient, then the preference would be triggered upon detection of receipt of the email communication in which the recipient is the hidden recipient. If the hidden recipient preferences are not triggered, then the process ends. If the hidden recipient preferences are triggered, then the process passes to block 706. Block 706 depicts blocking the options specified in the triggered warning preferences, and the process ends.

While the invention has been particularly shown and described with reference to a preferred embodiment, it will be understood by those skilled in the art that various changes in form and detail may be made therein without departing from the spirit and scope of the invention

What is claimed is:

1. A method for managing responses to an electronic communication sent to a plurality of recipients, comprising:

receiving, by an email controller for a particular recipient, an electronic communication sent by a sender to a plurality of recipients including said particular recipient identified as a hidden recipient whose receipt of said electronic communication is hidden from other recipients from among said plurality of recipients and sent to at least one general recipient whose receipt of said electronic communication is published to said plurality of recipients;

responsive to said email controller receiving said electronic communication with said particular recipient identified as said hidden recipient, triggering a hidden recipient manager to manage a plurality of response options to said electronic communication comprising a request to reply to said electronic communication, a request to reply to all of said plurality of recipients of said electronic communication, a request to forward said electronic communication, and a request to copy and paste a portion of the contents of said electronic communication;

accessing, by said hidden recipient manager, at least one hidden preference set by said hidden recipient for management of responses of at least one blocking preference and at least one warning preference;

responsive to said hidden recipient manager detecting said particular recipient select said electronic communication, blocking said particular recipient from selecting at least one response option from among a plurality of response options, wherein said at least one reply option is selected according to said at least one blocking preference;

responsive to said hidden recipient manager detecting a request by said particular recipient to respond to said electronic communication through selection of an unblocked response option from among said plurality of response options, detecting whether said request to respond is addressed to at least one recipient other than a sender of said electronic communication;

responsive to detecting said request to respond comprises said at least one recipient other than said sender, triggering a warning output from among a popup window displayed with a warning message and an audible warning message for output to said particular recipient according to said at least one warning preference; and warning said hidden recipient that said request to respond is addressed to at least one recipient unaware of receipt of said electronic communication by said hidden recipient according to said warning output.

2. The method according to claim 1, further comprising:

detecting whether said request to respond to said electronic communication comprises at least one recipient other than said sender and whether said at least one recipient other than said sender is among a plurality of employees of an employer of said hidden recipient;

responsive to detecting said at least one recipient other than said sender is among said plurality of employees of an employer of said hidden recipient, warning said recipient that said request to respond is addressed to at least one recipient unaware of receipt of said electronic communication by said hidden recipient by said email client blocking said request to respond to said electronic communication.

3. The method according to claim 1, further comprising:

responsive to an email client detecting said electronic communication received by said hidden recipient of said electronic communication, graphically distinguishing, by said email client, a first selectable response option for said hidden recipient to forward said electronic communication and second selectable response option for said hidden recipient to reply to said plurality of recipients and said sender from a third selectable response option to only reply to said sender of said electronic communication.

4. The method according to claim 1, wherein warning said hidden recipient that said request to respond is addressed to at least one recipient unaware of receipt of said electronic communication by said hidden recipient further comprises:

warning said hidden recipient through a separate window requiring said hidden recipient to select at least one of continuing with said response request and canceling said response request.

5. A system for managing responses to an electronic communication sent to a plurality of recipients, comprising:

at least one computing system comprising a processor communicatively connected to a network for managing electronic communications by a particular user;

said computing system further comprising an email controller for receiving, for a particular recipient, an electronic communication sent by a sender to a plurality of recipients including said particular recipient identified as a hidden recipient whose receipt of said electronic communication is hidden from other recipients from among said plurality of recipients and sent to at least one general recipient whose receipt of said electronic communication is published to said plurality of recipients;

said computing system further comprising a hidden recipient manager, responsive to said email controller receiving said electronic communication with said particular recipient identified as said hidden recipient, for managing a plurality of response options to said electronic communication comprising a request to reply to said electronic communication, a request to reply to all of said plurality of recipients of said electronic communication, a request to forward said electronic communication, and a request to copy and paste a portion of the contents of said electronic communication;

said hidden recipient manager for accessing at least one hidden preference set by said hidden recipient for management of responses of at least one blocking preference and at least one warning preference;

said hidden recipient manager, responsive to detecting said particular recipient select said electronic communication, for blocking said particular recipient from selecting at least one response option from among a plurality of response options, wherein said at least one reply option is selected according to said at least one blocking preference;

said hidden recipient manager, responsive to detecting a request by said particular recipient to respond to said electronic communication through selection of an unblocked response option from among said plurality of response options, for detecting whether said request to respond is addressed to at least one recipient other than a sender of said electronic communication;

said hidden recipient manager, responsive to detecting said request to respond comprises said at least one recipient other than said sender, for triggering a warning output from among a popup window displayed with a warning message and an audible warning message for output to said particular recipient according to said at least one warning preference; and said hidden recipient manager for warning said hidden recipient that said request to respond is addressed to at least one recipient unaware of receipt of said electronic communication by said hidden recipient.

6. The system according to claim 5, said computing system further comprising:

said hidden recipient manager for detecting whether said request to respond to said electronic communication comprises at least one recipient other than said sender and whether said at least one recipient other than said sender is among a plurality of employees of an employer of said hidden recipient;

said hidden recipient manager, responsive to detecting said at least one recipient other than said sender is among said plurality of employees of an employer of said hidden recipient, for warning said recipient that said request to respond is addressed to at least one recipient unaware of receipt of said electronic communication by said hidden recipient by said email client blocking said request to respond to said electronic communication.

7. The system according to claim 5, said computing system further comprising:
said hidden recipient manager, responsive to an email client detecting said electronic communication received by said hidden recipient of said electronic communication, for graphically distinguishing, by said email client, a first selectable response option for said hidden recipient to forward said electronic communication and second selectable response option for said hidden recipient to reply to said plurality of recipients and said sender from a third selectable response option to only reply to said sender of said electronic communication.

8. The system according to claim 5, said computing system further comprising:
said hidden recipient manager for warning said hidden recipient through a separate window requiring said hidden recipient to select at least one of continuing with said response request and canceling said response request.

9. The system according to claim 5, said computing system further comprising:
said hidden recipient manager for warning said hidden recipient through an audible indicator that said request to respond is addressed to at least one recipient other than said sender.

10. A program for managing responses to an electronic communication sent to a plurality of recipients, said program embodied in a non-transitory computer-readable medium, said program comprising computer-executable instructions which when executed on a computer cause the computer to perform the steps of:
receiving, by an email controller for a particular recipient, an electronic communication sent by a sender to a plurality of recipients including said particular recipient identified as a hidden recipient whose receipt of said electronic communication is hidden from other recipients from among said plurality of recipients and sent to at least one general recipient whose receipt of said electronic communication is published to said plurality of recipients;
responsive to said email controller receiving said electronic communication with said particular recipient identified as said hidden recipient, triggering a hidden recipient manager to manage a plurality of response options to said electronic communication comprising a request to reply to said electronic communication, a request to reply to all of said plurality of recipients of said electronic communication, a request to forward said electronic communication, and a request to copy and paste a portion of the contents of said electronic communication;
accessing, by said hidden recipient manager, at least one hidden preference set by said hidden recipient for management of responses of at least one blocking preference and at least one warning preference;
responsive to said hidden recipient manager detecting said particular recipient select said electronic communication, blocking said particular recipient from selecting at least one response option from among a plurality of response options, wherein said at least one reply option is selected according to said at least one blocking preference;
responsive to said hidden recipient manager detecting a request by said particular recipient to respond to said electronic communication through selection of an unblocked response option from among said plurality of response options, detecting whether said request to respond is addressed to at least one recipient other than a sender of said electronic communication; and
responsive to detecting said request to respond comprises said at least one recipient other than said sender, triggering a warning output from among a popup window displayed with a warning message and an audible warning message for output to said particular recipient according to said at least one warning preference;
warning said hidden recipient that said request to respond is addressed to at least one recipient unaware of receipt of said electronic communication by said hidden recipient according to said warning output.

11. The program according to claim 10, said program further comprising computer-executable instructions which cause a computer to perform the steps of:
detecting whether said request to respond to said electronic communication comprises at least one recipient other than said sender and whether said at least one recipient other than said sender is among a plurality of employees of an employer of said hidden recipient;
responsive to detecting said at least one recipient other than said sender is among said plurality of employees of an employer of said hidden recipient, warning said recipient that said request to respond is addressed to at least one recipient unaware of receipt of said electronic communication by said hidden recipient by said email client blocking said request to respond to said electronic communication.

* * * * *